_

2,832,687

VAT OR PASTEURIZER METHOD FOR
PREPARING CULTURED CREAM

Clarence Bronson Lane and Raymond France, Walton, N. Y., and Herman Gold, Paterson, N. J., assignors, by mesne assignments, to National Dairy Products Corporation, New York, N. Y., a corporation of Delaware No Drawing. Application March 8, 1955
Serial No. 493,052

8 Claims. (Cl. 99—59)

The present invention relates to a method for preparing cultured cream, and more particularly to a vat or pasteurizer method for preparing cultured cream.

Cultured cream is a smooth, heavy-bodied dairy product which is made by pasteurizing, homogenizing, and ripening a light cream. Ripening is accomplished by means of a starter containing Streptococcus lactis, together with other flavor producing bacteria. The pleasant mild-acid flavor in the smooth, firm body are mainly due to these microorganisms.

This product is known on the market by various other names, such as cultured market cream, sour cream, sour market cream, cultured sour cream, and salad cream. Such foods as soups, salads, fruits, vegetables, meats, fish and cheeses may be satisfactorily embellished and enriched with cultured cream. It also make take the place of buttermilk or sweet cream in cookery.

At the present time, there are two methods of preparing cultured cream which are in general use throughout the industry. In the first method, individual retail containers are filled with pre-inoculated cream which is incubated until the desired acidity is obtained and then chilled in a cold room. In the second method, inoculated cream is incubated in cans and after the proper acidity has developed, it is chilled in a cold room. After the cultured cream is chilled (usually 24–48 hours), it is agitated gently and transferred to a filling machine for packaging in retail containers.

The first method is disadvantageous in that the cultured cream has a hard body and it is grainy and not characteristic of cultured cream as it is known to the trade. Furthermore, the appearance of the cultured cream is dull rather than shiny and when the cultured cream is spooned, an excessive and unsightly whey separation develops in the container.

The second method is also disadvantageous since the cultured cream must be removed from the cans before packaging in retail containers thereby allowing possible contamination. Excessive labor is necessary for processing and handling the cultured cream. There is a loss of cultured cream adhering to the cans upon transfer of the cultured cream from the cans to a filling machine. Moreover, the cultured cream cannot be packaged until thoroughly chilled which takes at least two days under normal refrigeration temperatures. Thus the process is time consuming and may thereby result in the cultured cream having a stale flavor.

In an effort to overcome these objectionable features it has been proposed to prepare cultured cream in a vat or pasteurizer. This has the attendant advantages of a saving in labor, improved sanitation, and better uniformity of the product. Heretofore, however, it has not been possible to make a product by the vat or pasteurizer method which has the desired physical characteristics. Such products have usually had objectionable graininess. The present day vat or pasteurizer method for preparing cultured cream consists of incubating cream in a vat, stirring the resulting cultured cream with an agitator, conveying the product to a filling machine by means of air pressure, and cooling the containers filled with cultured cream from the filling machine in a cold room.

An object of the present invention is to provide a vat or pasteurizer method for preparing cultured cream which results in a saving of labor, prevents possible contamination, is neater in operation, and which produces a satisfactory cultured cream. The cultured cream has a rather heavy body and a clean fresh flavor, is smooth, the moisture is well incorporated and the cream is free of objectionable graininess. In addition, the cultured cream has a shiny appearance and good body and does not develop an excessive amount of whey.

The invention provides a process whereby cultured cream may be agitated and pumped from a vat or pasteurizer to retail containers without prior chilling of the cultured cream. This constitutes a revolutionary development since experts in the art have always maintained that cultured cream should not be disturbed in any way until it had been thoroughly chilled because this produced a cultured cream which was very lumpy and had a rough texture.

In general, the process comprises pasteurizing and then homogenizing cream, followed by incubating cream with a starter in a vat or pasteurizer. The resulting cultured cream is then forced through a restricted orifice, or a multiplicity of orifices which provide the type and amount of agitation necessary to form a satisfactory product. Agitation may be obtained by forcing the cream through a spring loaded valve, a wire mesh, a perforated metal disc, or a homogenizer operated with little or no pressure.

More particularly, the cream is first standardized in the range from about 16% to about 20% fat by using raw cream, raw skim milk, pasteurized skim milk, or condensed skim and water. This cream is pasteurized at about 160° to 165° F. for approximately thirty minutes and homogenized at 2500 pounds per square inch of pressure. If additional body is desired, the homogenizing may be repeated at 2500 pounds per square inch pressure. Double homogenization is necessary in order to obtain a desirable body in the cultured cream in those areas where the use of a rennet stabilizer is not permitted by law. Double stage homogenization at 2500/700 pounds per square inch is a further alternative. A two stage Manton-Gaulin homogenizer may be employed in these operations.

The homogenized cream is then transferred to a vat or pasteurizer, such as an enclosed pasteurizer equipped with agitators, and cooled to 70° F., after which a suitable starter containing Streptococcus lactis (such, for examples, as 1½% to 2% of "Flora Danica" culture) is added to ripen the cream. A rennet stabilizer is preferably added at this point, if permitted by law, in the ratio of 0.25 to 0.5 millimeter to each ten gallons of the cooled homogenized cream and the cream is held at this ripening temperature until the preferred acidity of about 0.65% has developed, the resulting cultured cream being stirred very gently with a minimum amount of agitation.

The cultured cream is then pumped from the vat or pasteurizer at the ripening temperature through a restricted orifice or a multiplicity of orifices. Thus, the cultured cream may be pumped through a wire screen in a sanitary pipe, such as a 100 mesh stainless steel wire screen inserted in a one inch sanitary pipe; through a homogenizer operated with little or no pressure; through a perforated metal disc; or preferably through a spring-loaded or compression valve, such as a one inch or one-half inch Cherry-Burrell 60-T valve. These orifices provide the type and amount of agitation necessary to form a satisfactory product. A pumping pressure of about 5 to 15 pounds per square inch is satisfactory to produce a smooth good-bodied cultured cream when the pre-ripened cream has originally been homogenized once at 2500 pounds per square inch. About 30 to 60 pounds per square inch pumping pressure can be employed when the pre-ripened cream has originally been homogenized twice at 2500 pounds per square inch. About 5 to 30 pounds per square inch pumping pressure is satisfactory when the pre-ripened cream has originally been homogenized at 2500/700 pounds per square inch double stage pressure. The use of excessive pressure will result in a thin-bodied product and the use of insufficient pressure will not produce a product free of objectionable graininess.

The cultured cream is pumped directly from the vat through the restricted orifice or orifices to a filling machine. At the filling machine the cultured cream is fed into retail containers and then chilled in a cold room to about 40° F.

The culturing vat or pasteurizer may have a sloping bottom with the outlet in the center of the vat to facilitate the removal of the cultured product. Also, a culturing vat or pasteurizer may be employed to which a small amount of air pressure, such as 2 to 5 pounds per square inch, can be applied. Such vats aid in supplying a steady flow of cultured cream to the pump which forces the cultured cream from the vat through the restricted orifice or orifices. A positive action pump with a variable speed drive, such as a Waukesha or Waterous pump, should be employed, a sanitary diaphragm gauge (0-100 pounds) being located between the pump and the spring-loaded valve to measure back pressure, if desired.

A comparison was made of the cultured cream produced by the process of this invention with that produced by the two present day processes and the results thereof are set forth below.

Four 500 gallon lots of cultured cream were made to compare the three methods of ripening cream. Each lot of the pre-ripened cream was standardized, pasteurized and homogenized at 2500/700 pounds per square inch double stage pressure by the steps heretofore described, then divided into three parts, and treated as follows. In method A the cream was placed in retail containers and allowed to ripen in the containers before chilling. In method B the cream was ripened in 40 qt. cans, chilled and then packaged. In method C the cream was ripened in a pasteurizer, forced through a restriction at 15 to 30 lbs. per square inch pressure, packaged and chilled. A comparison of the data on the body, texture, flavor, appearance and degree of whey separation of the cultured cream products is shown in Table I.

*Table I*

LOT 1

| | Body | Texture | Flavor | Appearance | Degree Whey Separation |
|---|---|---|---|---|---|
| Method A | Heavy | Grainy | Clean | Dull | Excessive. |
| Method B | Medium | Smooth | Sl. stale | Shiny | Slight. |
| Method C | Heavy | do | Clean | do | Do. |

LOT 2

| | Body | Texture | Flavor | Appearance | Degree Whey Separation |
|---|---|---|---|---|---|
| Method A | Heavy | Grainy | Clean | Dull | Excessive. |
| Method B | do | Smooth | Sl. stale | Shiny | Slight. |
| Method C | do | do | Clean | do | Do. |

LOT 3

| | Body | Texture | Flavor | Appearance | Degree Whey Separation |
|---|---|---|---|---|---|
| Method A | Heavy | Grainy | Clean | Dull | Excessive. |
| Method B | Medium | Smooth | Sl. stale | Shiny | Slight. |
| Method C | Heavy | do | Clean | do | Do. |

LOT 4

| | Body | Texture | Flavor | Appearance | Degree Whey Separation |
|---|---|---|---|---|---|
| Method A | Heavy | Grainy | Clean | Dull | Excessive. |
| Method B | Medium | Smooth | do | Shiny | Slight. |
| Method C | Heavy | do | do | do | Do. |

The data revealed that cream ripened with Method A regularly had a grainy body and excessive whey separation. Cream ripened with method B had only a medium body in three of the four lots and a slightly stale flavor was noted in three lots. Cream ripened with method C, i. e., by the process of the invention, had no defects in all lots.

It will be understood that various modifications and changes may be made in this process by those skilled in the art without departing from the spirit or the scope thereof. The process is to be limited only within the scope of the appended claims.

We claim:

1. In a process for preparing cultured cream the steps of ripening cream having a fat content of from about 16% to about 20% with a starter in a vat, stirring the resulting cultured cream, forcing the cultured cream under pressure from the vat through at least one restricted orifice to a container while the cultured cream is still warm, and thereafter chilling the cultured cream, whereby a heavy-bodied, smooth, and shiny cultured cream is produced.

2. The vat process for preparing cultured cream comprising pasteurizing cream having a fat content of from about 16% to about 20%, homogenizing the resulting pasteurized cream at least once under pressure, cooling the resulting pasteurized and homogenized cream, ripening the cream with a starter in a vat, stirring the resulting cultured cream, forcing the cultured cream under pressure from the vat through at least one restricted orifice to a container while the cultured cream is still warm, and thereafter chilling the cultured cream, whereby a heavy-bodied, smooth, and shiny cultured cream is produced.

3. The vat process for preparing cultured cream comprising pasteurizing cream testing about 18.5% fat at about 160° to about 165° F. for about 30 minutes, homogenizing the resulting pasteurized cream at a pressure of about 2500 lbs. per square inch, cooling the resulting pasteurized and homogenized cream in a vat to about 70° F., ripening the cream with a starter at about 70° F. until an acidity of about 0.65% has developed, stirring the resulting cultured cream very gently, forcing the cultured cream from the vat through at least one restricted orifice under a pressure of about 5 to 15 pounds per square inch to a container while the cultured cream is still warm, and thereafter chilling the cultured cream, whereby a heavy-bodied, smooth, shiny cultured cream is produced.

4. The vat process for preparing cultured cream, comprising pasteurizing cream testing about 18.5% fat at about 160° to about 165° F. for about 30 minutes, homogenizing the resulting pasteurized cream twice at a pressure of 2500 pounds per square inch, cooling the resulting pasteurized and homogenized cream in a vat to about 70° F., ripening the cream with a starter at about 70° F. until an acidity of about 0.65% has developed, stirring the resulting cultured cream very gently, forcing the cultured cream from the vat through at least one restricted orifice under a pressure of about 30 to 60 pounds per square inch to a container while the cultured cream is still warm, and thereafter chilling the cultured cream, whereby a heavy-bodied, smooth, shiny cultured cream is produced.

5. The vat process of preparing cultured cream comprising pasteurizing cream testing about 18.5% fat at about 160° to 165° F. for about 30 minutes, homogenizing the resulting pasteurized cream at 2500/700 pounds per square inch double stage pressure, cooling the resulting pasteurized and homogenized cream in a vat to about 70° F., ripening the cream with a starter at about 70° F. until an acidity of about 0.65% has developed, stirring the resulting cultured cream very gently, forcing the cultured cream from the vat through at least one restricted orifice under a pressure of about 5 to 30 pounds per square inch to a container while the cultured cream is still warm, and thereafter chilling the cultured cream, whereby a heavy-bodied, smooth, and shiny cultured cream is produced.

6. The process as set forth in claim 3 wherein about 0.25 to 0.5 millimeter of rennet stabilizer is added to each 10 gallons of the cooled pasteurized and homogenized cream.

7. The process as set forth in claim 4 wherein about 0.25 to 0.5 millimeter of rennet stabilizer is added to each 10 gallons of the cooled pasteurized and homogenized cream.

8. The process as set forth in claim 5 wherein about 0.25 to 0.5 millimeter of rennet stabilizer is added to each 10 gallons of the cooled pasteurized and homogenized cream.

References Cited in the file of this patent

UNITED STATES PATENTS

| | | |
|---|---|---|
| 790,467 | Valerius | May 23, 1905 |
| 1,722,710 | Rogers | July 30, 1929 |

UNITED STATES PATENT OFFICE

CERTIFICATE OF CORRECTION

Patent No. 2,832,687                                April 29, 1958

Clarence Bronson Lane et al.

It is hereby certified that error appears in the printed specification of the above numbered patent requiring correction and that the said Letters Patent should read as corrected below.

Column 1, line 30, for "make" read -- may --; column 2, line 57, column 5, line 10, claim 6; column 6, line 1, claim 7; and line 5, claim 8, for "millimeter", each occurrence, read -- milliliter --.

Signed and sealed this 8th day of July 1958.

(SEAL)
Attest:
KARL H. AXLINE

Attesting Officer

ROBERT C. WATSON
Commissioner of Patents